(12) United States Patent
Dörfler et al.

(10) Patent No.: US 10,890,268 B2
(45) Date of Patent: Jan. 12, 2021

(54) VALVE AND VALVE ARRANGEMENT

(71) Applicant: Alfmeier Präzision SE, Treuchtlingen (DE)

(72) Inventors: Erich Dörfler, Landsberg (DE); Matthias Mitzler, Graben (DE)

(73) Assignee: Alfmeier Präzision SE, Treuchtlingen (DE)

( * ) Notice: Subject to any disclaimer, the term of this patent is extended or adjusted under 35 U.S.C. 154(b) by 73 days.

(21) Appl. No.: 16/372,662

(22) Filed: Apr. 2, 2019

(65) Prior Publication Data

US 2019/0309871 A1    Oct. 10, 2019

(30) Foreign Application Priority Data

Apr. 5, 2018 (DE) .................. 10 2018 108 069

(51) Int. Cl.
  *F16K 31/00* (2006.01)
(52) U.S. Cl.
  CPC .................. *F16K 31/002* (2013.01)
(58) Field of Classification Search
  CPC ...... F16K 31/002; F16K 31/025; F16K 11/22; F16K 27/003; F16K 27/02; F16K 31/02; F16K 99/0038
  See application file for complete search history.

(56) References Cited

U.S. PATENT DOCUMENTS

| 6,929,019 B2 * | 8/2005 | Weinmann | F16K 31/006 137/15.21 |
| 2003/0070716 A1 * | 4/2003 | Giousouf | F16K 31/025 137/625.65 |

FOREIGN PATENT DOCUMENTS

DE  10 2016 215 814 A1  3/2018
DE  10 2017 116 841 A1  1/2019

OTHER PUBLICATIONS

German Patent Office Action dated Feb. 13, 2019 with Machine Translation.

* cited by examiner

*Primary Examiner* — Michael R Reid
(74) *Attorney, Agent, or Firm* — JK Intellectual Property Law, PA

(57) ABSTRACT

A valve includes a flow chamber and an actuating chamber, and a connecting valve opening. An actuating element can close or open the valve opening. An SMA element and a restoring element move the actuating element in opposite directions. A first area of the flow chamber is attachable to an air supply unit, and a second area of the flow chamber is attachable to a media reservoir and to atmosphere to release air from the flow chamber via an opening. An actuator coupled with the actuating element selectively connects the opening to atmosphere or closes the opening. A first check valve prevents fluid from flowing back from the second area of the flow chamber through the valve opening into the first area of the flow chamber when the actuating element is in the opening position.

18 Claims, 10 Drawing Sheets

VALVE AND VALVE ARRANGEMENT

CROSS-REFERENCE TO RELATED APPLICATIONS

This application claims benefit to German Patent Application No. 10 2018 108069.7, filed Apr. 5, 2018, which is incorporated by reference herein in its entirety.

DESCRIPTION

The disclosure relates to a valve with a valve housing that encloses a valve space and has at least one valve opening. To operate one such valve, an actuating element movable between a closing position to close the valve opening and an opening position to release the valve opening has been arranged inside the valve. The disclosure also relates to a valve arrangement having several valves.

The actuating element can move from the opening to the closing position with the help of Shape Memory Alloys (SMA) that can be shaped, for example, like wires. They are alloys that can exist in two different crystalline structures depending on their temperature. At room temperature, there is a martensitic structure with a tetragonal room-centered lattice that transforms into an austenitic structure with a cubic face-centered lattice starting at a transformation temperature of about 80° C. Therefore, a wire from such a shape memory alloy has a shortening property because the lattice undergoes a transformation from a martensitic to an austenitic structure when it is heated above the transformation temperature. The SMA element is usually supplied with electricity to heat it so it can be shortened and therefore move the actuating element.

BACKGROUND

For example, a valve with a valve housing enclosing a pressure chamber is known from DE 10 2005 060 217, wherein a stem is arranged inside the pressure chamber to open and close a valve opening. In this case, to open the valve opening, the stem is operated by an SMA element electrically connected to a printed circuit board arranged inside the valve opening so it can be supplied with electricity. The SMA element is arranged inside the pressure chamber and therefore directly exposed to the volume flow of the valve, i.e. to the air that flows in and out of the pressure chamber through the valve openings.

Such a valve or valve arrangement can be used for filling media reservoirs such as fluid bubbles, especially air bubbles or air cushions in the area of automobile seats. The known valves with only one actuator can be used either for filling or emptying the bubble. Individually, they are not suitable to maintain a pressure in the bubble. To achieve this, two of the known valves are combined.

SUMMARY

It is therefore the task of the disclosed subject matter to specify a valve and valve arrangement that have been improved with regard to the above-mentioned disadvantages.

The task mentioned first is solved by a valve that has the characteristics according to the disclosed subject matter. The valve has a valve housing that comprises a housing cover, a housing bottom and an intermediate housing arranged between the housing cover and the housing bottom. The valve housing encloses a valve space that comprises a flow chamber and an actuating chamber, whereby the valve housing has at least one valve opening coming from the flow chamber that ends in the actuating chamber. Here, valve space is understood to be the entire valve interior enclosed by the valve housing. Inside the actuating chamber there are arranged, at least, one actuating element that can be axially moved between a closing position to close the valve opening and an opening position to release the valve opening, one wire- or ribbon-shaped SMA element from a shape memory alloy that serves to operate the actuating element in opening direction or stroke direction, one restoring element that serves to move the actuating element in closing direction or resetting direction, and one printed circuit board. To operate the actuating element, the SMA element is fixed to the actuating element with a middle section and its ends directly or indirectly electrically connected to the printed circuit for supplying it with electricity. The flow chamber and the actuating chamber are fluidically separated from one another in such a way by a separating wall in the valve opening that a fluid flowing through the valve is guided through the flow chamber when the actuating element is operated. For the purposes of this disclosure, a "valve opening ending in the actuating chamber from the flow chamber" can also be understood as the valve opening possibly being formed on a boundary between flow chamber and actuating chamber or that the valve opening can be arranged in the flow chamber in a way oriented to another opening of the actuating chamber so the valve opening can be closed by the actuating element arranged in the actuating chamber.

In the valve according to the disclosure, the valve space through which a fluid—especially air—flows has been divided into two sub-spaces essentially fluidically separated from one another, namely one actuating chamber or actuator space inside of which all components necessary to operate the valve or open the valve opening are arranged, and a flow chamber through which the fluid can flow through.

Here, a first area of the flow chamber and a second area of the flow chamber are connected to one another through the valve opening and/or a connecting channel, whereby the valve opening and/or the connecting channel are closed in the closing position of the actuating element and released in the opening position of the actuating element. The first and the second area of the flow chamber are thus arranged on different sides of the valve opening and connected to one another through a connecting channel or connecting area, whereby the first and the second area are fluidically connected to one another only when the valve opening has been opened. Here, a connecting channel is understood to be the valve area between the actuating element to close and release the valve opening and the sealing seat surrounding the valve opening, which completely surrounds the actuating element, for example. When the valve opening is closed, the connecting channel is connected to one of the two areas of the flow chambers, so that the fluid is also distributed inside the connecting channel or valve area. Here, the connecting channel can be developed in an edge area of the actuating chamber.

To supply air to the flow chamber, the first area of the flow chamber is attached or can be attached to an air supply unit or the valve has a pressure connection ending in the first area of the flow chamber. The second area of the flow chamber is attached or can be attached to a media reservoir, which can be the air cushion of a car seat with contour adjustment, or it has a consumer connection ending in the second area of the flow chamber, so that the media reservoir can be filled with air when the valve is open. To let air out of the flow chamber (in other words, to empty the media reservoir) the flow chamber is connected or can be connected to the atmosphere through an opening. When the valve opening is open, a fluid—especially air—flows through the flow chamber, namely when the media reservoir is filled, for example, with air from the first area of the flow chamber connected to the air supply unit through the connecting channel in the second area of the flow chamber and to the media reservoir. When the media reservoir is emptied, the fluid flows back into the flow chamber and from there out of the valve to the atmosphere through the opening. The opening is preferably executed in the housing cover, which borders the flow chamber on the upper side.

In the valve according to the disclosure, inside the second area of the flow chamber an actuator has been arranged that has been mounted on the intermediate housing in such a pivoted or swiveling way and coupled with the actuating element that the opening to the atmosphere is released when the actuating element is in closing position and the opening is closed when the actuating element is in releasing position. A first check valve that prevents fluid from flowing back from the second area of the flow chamber through the valve opening and to the first area of the flow chamber when the actuating element is in opening position is provided in or on the valve opening.

In a section of the opening facing the atmosphere, the actuator preferably holds a second sealing element and/or includes a restoring element such as a spring or leaf spring that holds the actuator in the closing direction of the opening in a tensioning way. With such a variant, it is possible to cyclically fill and vent the media reservoir, thereby ensuring that the valve and therefore the media reservoir are always vented when the actuating element of the valve is not operated.

The first check valve is preferably arranged on the side of the second area of the flow chamber.

Expediently, the actuator includes a shift finger on an end section facing the actuating element, and the first check valve is formed by a third sealing element formed on the shift finger and a valve seat arranged in the separating wall. The shift finger can include a projection that serves to position the third sealing element. The valve seat is arranged on the side of the valve opening facing the second area of the flow chamber. Conversely, the sealing seat (which is closed or released by operating the actuating element especially by means of a first sealing element) is arranged on the side of the valve opening facing the actuating chamber.

The third sealing element can be a plate-shaped element, designed especially as a circular disc with a through hole.

In one design, the third sealing element is made of metal, plastic or also an elastomer. In a preferred valve design, the separating wall that separates the flow chamber and the actuating chamber from one another is formed from the intermediate housing of the valve, i.e. executed as one single piece with it. Thus, the flow chamber is advantageously formed by the intermediate housing or partially enveloped by it and closed by the housing cover on the upper side and/or the actuating chamber is formed by the intermediate housing or partially enveloped and closed by the housing bottom on the lower side. This has the advantage that no additional, separate components are needed for developing the two chambers, thereby achieving economical manufacturing and easy assembly of the valve. In order to reduce even more the number of components needed for the functionality of the valve, in an advantageous embodiment the pressure connection and/or the consumer connection as well as the guiding elements to guide the actuating element and/or fastening element to fix the printed circuit board inside the valve housing are also executed as one single piece with the intermediate housing or integrated into it.

In a preferred embodiment, the flow chamber and the actuating chamber are fluidically connected through at least one air gap. The air gap or fluid channel is thus arranged in an area surrounding the valve opening, leads especially from the flow chamber, especially from the connecting channel or valve area and/or the first area of the flow chamber, to the actuating chamber. Although the fluidic connection of the flow chamber and the actuating chamber ensures a pressure equalization between the flow chamber and the actuating chamber by the at least one fluid channel or air gap even when the valve opening is closed, only a secondary current of the flowing fluid flows into the actuating chamber and thus around the SMA elements, which are then cooled by the flowing fluid. The pressure is equalized quickly due to the small volume of the actuating chamber.

The separating wall has preferably a partition wall that encircles the valve opening at least partially and extends into the actuating chamber in the direction of movement of the actuating element, forming a receiving space for the actuating element. Here, the actuating element, particularly a first end section of the actuating element facing the valve opening, is led into the receiving space. The at least one air gap ends especially in the receiving space from the flow chamber.

On the first end section facing the valve opening, the actuating element has especially a sealing element to close the valve opening that ends laterally at a distance before the partition wall forming the receiving space to develop the at least one air gap.

In another preferred design, a second end section of a consumer connection facing the second area of the flow chamber has a larger clear width than a first end section facing the media reservoir, whereby in particular the end section of the consumer connection for the media reservoir that faces the flow chamber is formed by the intermediate housing and/or the housing cover and the end section of the intermediate housing facing the media reservoir. In other words: The end section of the consumer connection on which the fluid flows out of the flow chamber or flows into the consumer connection is executed in a conical or funnel shape, thereby preventing turbulence and improving the flow to the media reservoir. The pressure connection and/or the consumer connection are thus preferably executed in such a way that they have a first end section facing away from the valve space and tapering to a free end, and a second end section facing the valve space, whereby the second end section is narrowed at least in part radially in circumferential direction. In other words: A free end of the pressure connection and/or of the consumer connection or of the connection nozzle has a smaller external diameter than an end facing the valve space, thereby simplifying the hose attachment. The partially radial narrowing of the second end section creates a rear grip surface by means of which a hose attached to the connector can be fixed or secured against removal.

The task to specify a valve arrangement is solved by a valve arrangement having the characteristics according to the disclosed subject matter. The valve arrangement comprises several valves executed in each case especially according to the aforementioned way. The valve housings that enclose the valve space of each valve, especially the intermediate housings and/or housing covers and/or housing bottoms and/or the printed circuit boards, are executed as one single piece. In other words: The valve spaces of all valves of the valve arrangement are enclosed by a common valve housing or a common intermediate housing and/or housing cover and/or housing bottom. Furthermore, since all SMA elements of the several valves are electrically connected to a common printed circuit board, the number of needed components can be drastically reduced. Such a valve arrangement is integrated, for example, into a car seat with contour adjustment or massage function.

In an advantageous embodiment, the several valves have one common pressure connection that in each case ends in the valve space, especially in the flow chamber, very preferably in the first area of the flow chamber of the valves or in an area including the first areas of the flow chambers or is in each case connected to the valve space, particularly the flow chamber, especially preferable to the first area of the flow chambers or the area above at least one air channel, whereby each valve has one separate opening to connect the valve space, especially the flow chamber, to the atmosphere, that ends especially in the second area of the flow chamber. In other words: With the common pressure connection, the valve spaces of all valves are fluidically connected, particularly through the air channels and/or chambers or areas integrated into the intermediate housing or formed by it to supply air to the respective valve spaces or flow chambers, specifically to the first areas of the flow chambers. In addition, the valve spaces of all valves are in each case connected to the atmosphere through an opening, especially once again by the air channels integrated into the intermediate housing or formed by it and/or chambers to release air from the corresponding valve spaces or flow chambers, specifically from the second areas of the flow chambers. By closing the first check valve while simultaneously closing the opening to the atmosphere, the pressure in the media reservoir is maintained constant. Such a valve arrangement can be used, for example, in car seats with massage function.

In a preferred design, the valve spaces of the several valves are separated at least from the receiving space for the electronic contacting of the printed circuit board by a separating wall, whereby the separating wall is executed as one single piece with the intermediate housing. The several valves can be operated independently from one another in order to specifically fill or vent individual air cushions.

In their assembled state, the separating walls have in this case especially a pneumatically sealed passage opening for the printed circuit board.

In another advantageous variant, guiding elements are arranged in such a way in an air channel leading from the air supply unit to the flow chamber(s) that a fluid flowing in or through the flow chambers has a laminar flow. Thus, a directional flow is generated to prevent turbulence that could lower the flow. Moreover, this also reduces the noise generated inside the valve or valve arrangement.

BRIEF DESCRIPTION OF THE DRAWINGS

The disclosed subject matter will now be explained in more detail below, also with regard to additional characteristics and advantages, by describing embodiments and with reference to the enclosed drawings. The schematic diagram shows in each case.

DETAILED DESCRIPTION

Figure 1:
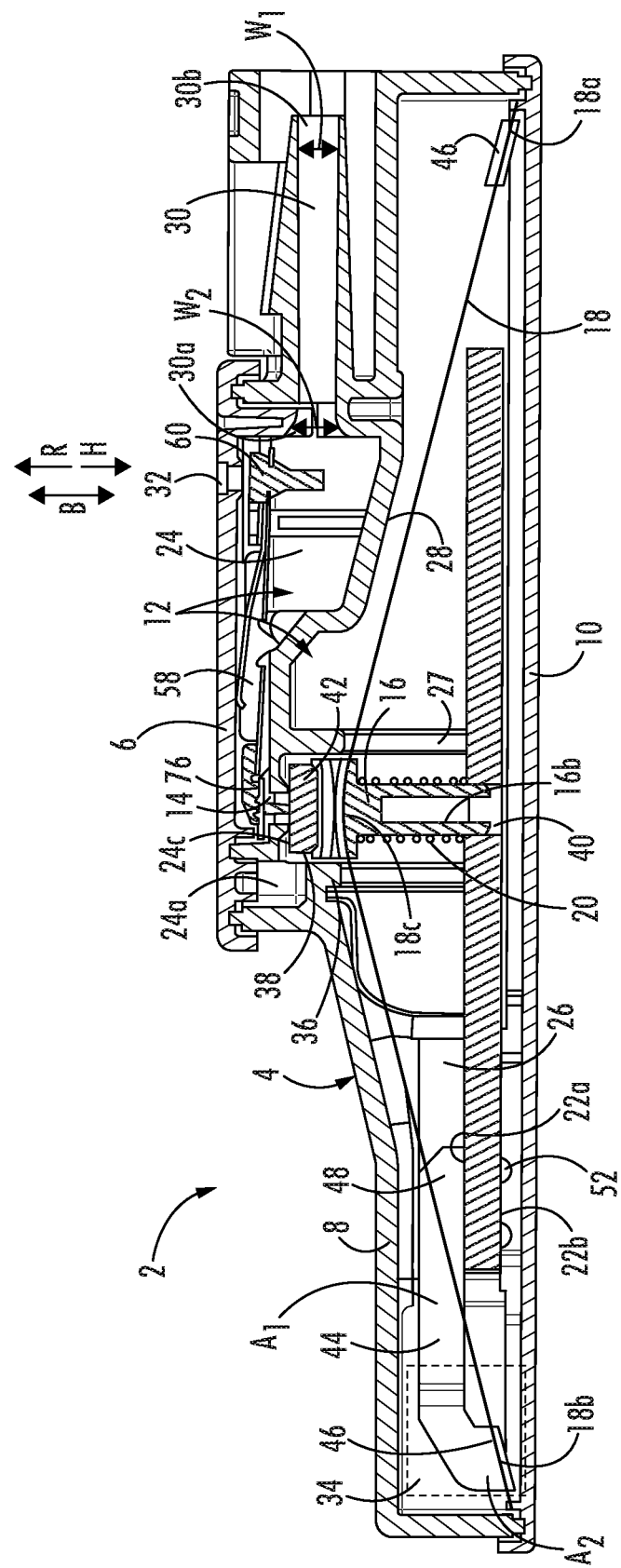
FIG. 1 is a cross-sectional view of a valve in closing position according to a first embodiment.

FIG. 1 shows a valve 2 with a valve housing 4, which consists of an upper housing cover 6, a lower housing bottom 10 and an intermediate housing 8 arranged between the housing cover 6 and the housing bottom 10. The valve housing 4 encloses a valve space 12, in which a valve opening 14 ends. Inside the valve space 12, an actuating element 16 that can be moved axially in direction of movement B has been arranged between a closing position to close the valve opening 14 and an opening position to release the valve opening 14. A wire-shaped SMA element 18 made of a shape memory alloy, which is held on the actuating element 16 with a middle section 18c, specifically in its first end section 16a, serves to operate the actuating element 16 in opening direction or stroke direction H. To supply it with electricity, the ends 18a, 18b of the SMA element 18 are electrically connected to the printed circuit board 22 that is likewise arranged inside the valve space 12.

A restoring element 20, here a threaded compression spring that concentrically surrounds a second end section 16b of the actuating element 16 and supports itself with a first end on the printed circuit board 22 and with a second end on the end section 16b of the actuating element 16, which is radially widened in front of the second end section 16b, serves to move the actuating element 16 in a closing direction or resetting direction R.

The intermediate housing 8 comprises all components necessary for the valve 2 to function; in other words, all structural parts needed for this are integrated into the intermediate housing 8 itself, as will be described below.

The valve space 12 is divided into a flow chamber 24 and an actuating chamber 26 separated from one another by a separating wall 28, so that a fluid flowing through the valve 2 or valve space 12 when the actuating element 16 is operated merely flows through the flow chamber 24. Here, the flow chamber 24 is formed by the intermediate housing 8 and its upper side is closed by the housing cover 6. The actuating chamber 26 is likewise formed by the intermediate housing 8 and its lower side is closed by the housing bottom 10, thus making it possible to reduce the number of components needed. The actuating element 16 and the components necessary for operating the actuating element 16, namely the SMA element 18, the restoring element 20 and the printed circuit board 22, are arranged inside the actuating chamber 26. A purposeful guidance of the fluid's current prevents an uneven cooling of the SMA element 16. The separating wall 28 is executed as one single piece with the intermediate housing 8 or preformed on it. The flow chamber 24 has a first area 24a and a second area 24b attached to one another via a connecting channel 24c, which is closed in a closing position of the actuating element 16 and released in an opening position of the actuating element 16.

So air can be supplied to the valve space 12, specifically to the flow chamber 24, its first area 24a is connected to an air supply unit or pneumatic pump or pressure connection (not visible in FIG. 1), attached or to be attached to the pneumatic pump, and ends directly or indirectly in the first area 24a of the flow chamber 24. When the valve opening 14 is released, the supplied air can flow via the connecting channel 24c or the valve space 24c and through the valve opening 14 from the first area 24a to the second area 24b. The valve 2 serves particularly to fill a media reservoir (not shown), which can be an air cushion of a vehicle seat with contour adjustment. To achieve this, the valve space 12—to be more precise, the flow chamber 24 or its second area 24b—is fluidically connected to a consumer connection 30 or the consumer connection 30 ends in the second area 24b, so that the media reservoir can be connected to the valve 2 with hoses. Both the pressure connection and the consumer connection 30 have been developed as one single piece with the intermediate housing 8 and do not protrude from it.

Furthermore, the intermediate housing 8 has a receiving space 34 to receive the components necessary for the electrical contacting of the printed circuit board 22 (such as, for example, plug-in connectors), which in FIG. 1 is arranged in a back part of the intermediate housing 8 and shown merely in a dashed way.

To guide the actuating element 16 while it is being operated, guiding elements formed from the intermediate housing 8 are provided on the one hand. The guiding elements comprise a partition wall 36 that, starting from the separating wall 28 in an area of the valve opening 14, extends in direction of movement B into the actuating chamber 26 and is executed as one single piece with the separating wall 28 or the intermediate housing 8. The partition wall 36 borders a receiving space 38 for the upper first end section 16a that faces the valve opening 14. To guide the second end section 16b, guiding elements have been integrated into the printed circuit board 22, specifically in form of a recess 40 developed therein, here a passage opening, into which the second end section 16b extends both in the opening and in the closing position of the actuating element 16. To guide the SMA element 16, the partition wall 36 has recesses 27 extending in direction of movement B.

Thus, no further or separate guiding elements shaped like additional components are necessary either to guide the actuating element 16 while it moves axially in direction of movement B, i.e. while the actuating element 16 is being operated.

So the valve opening 14 can be reliably closed in the closing position—as shown in FIG. 1—a first sealing element 42, which acts together with a sealing seat surrounding the valve opening 14, has been arranged on the end section 16a facing the valve opening 14.

In order to control the valve 2 and supply the SMA element 18 with electricity so it can be shortened, thereby allowing the actuating element 16 to be operated, the ends 18a, 18b are electrically connected to the printed circuit board 22, namely in each case with a crimp connector 44. The ends 18a, 18b of the SMA element 18 are in each case fixed in a seat 46 of the crimp connector 44 and thus make direct contact with the printed circuit board 22 through the crimp connector 44. The crimp connectors 44 protrude perpendicularly to the direction of movement B in each case laterally with a protrusion $A_1$ above the printed circuit board 22. Furthermore, the crimp connectors 44 extend in stroke direction H from an upper side 22a of the printed circuit board 22 and parallel to it toward the housing bottom 8, i.e. with a protrusion $A_2$ starting from the upper side 22a of the printed circuit board 22 toward its bottom side 22b, whereby the seat 46 of the crimp connector 44 ends at a distance from the housing bottom 10, i.e. arranged in a free-floating way inside the valve space 12. A section 48 of the crimp connector 44 spaced apart from the seat 46 is electrically connected to the printed circuit board 22 by means of clamping elements 50 (not shown). In this case, the section 48 can lean both flat on the upper side 22a and also be least partially distant to the upper side 22a. In order to achieve a connection independent of tolerances of the printed circuit board 22 or its upper side 22a, the crimp connector 44 or its section 48 can be fully minimally spaced apart from the upper side 22a and the crimp connector 44 is supported merely by the clamping elements 50. Here, each crimp connector 44 has two primarily oval and ring-shaped clamping elements 50 extending in each case through a recess of the printed circuit board 22 that can be elastically deformed for insertion in the recess and in the assembled state held in the recess in an interlocking and/or form-fitting manner. Thus, the crimp connectors 44 establish the electrical connection between the ends 18a, 18b of the SMA element 18 fixed on them and the printed circuit board 22. The crimp connectors 44 protruding both laterally and also in stroke direction H allow an additional length of the SMA element 18, namely the length of the diagonal of an imaginary rectangle, to be used with the lateral lengths $A_1$ and $A_2$ to operate the actuating element 16. This makes an overall reduction of the height of the valve 2 possible. The printed circuit board 22 itself is contacted by a plug-in connector in the receiving space 34 of the intermediate housings 8 that can be plugged into an electrical connection.

To mount the printed circuit board 22 inside the valve space 12, the partition wall 36 developed in an integral way with the intermediate housing 8 has two deformable projections 52 as fastening elements, pre-formed on their front side and extending in the assembled state through a passage opening of the printed circuit board 22, and inextricably attached to the printed circuit board 22. At the same time, the front side creates a stopping face for the printed circuit board 22.

Figure 4A:
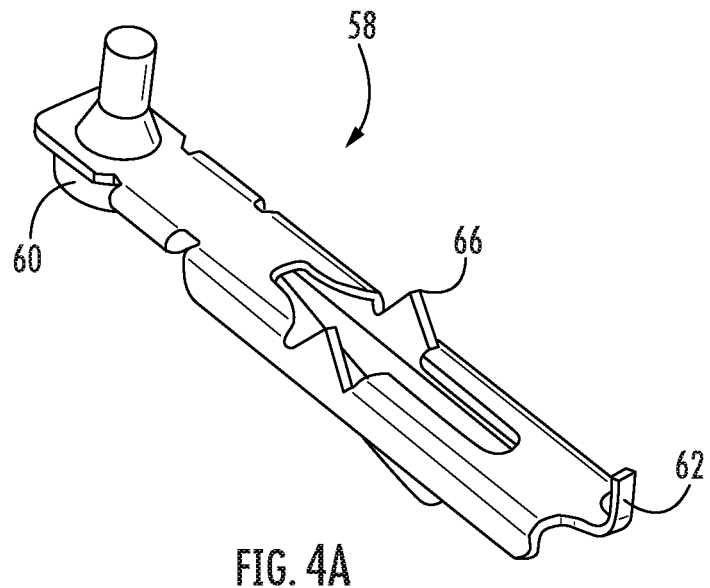
Figure 4B:
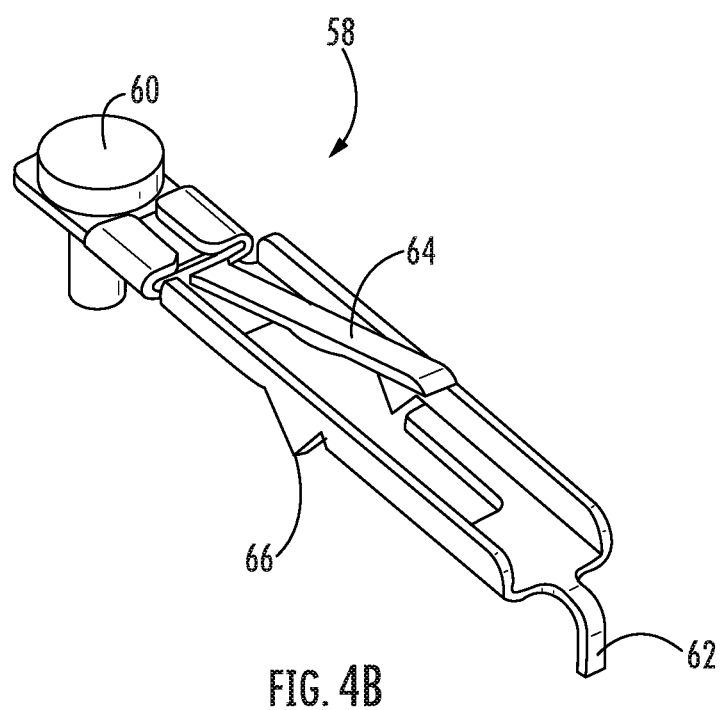
Figure 5A:
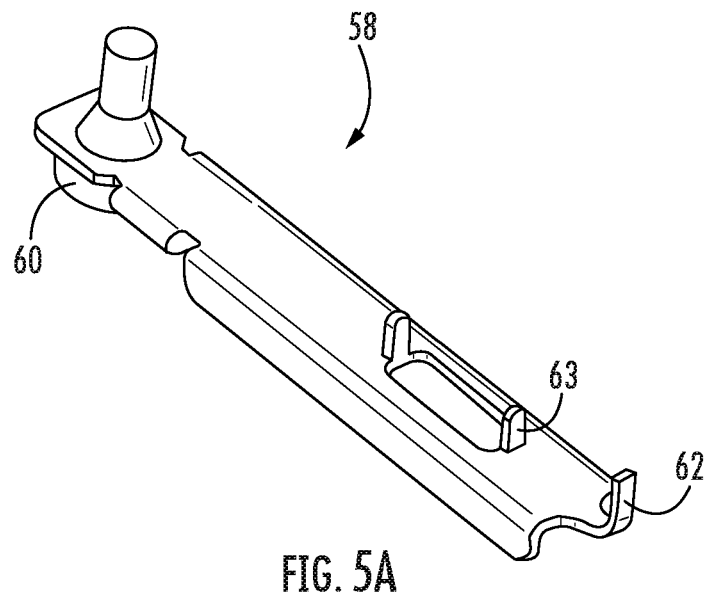
Figure 5B:
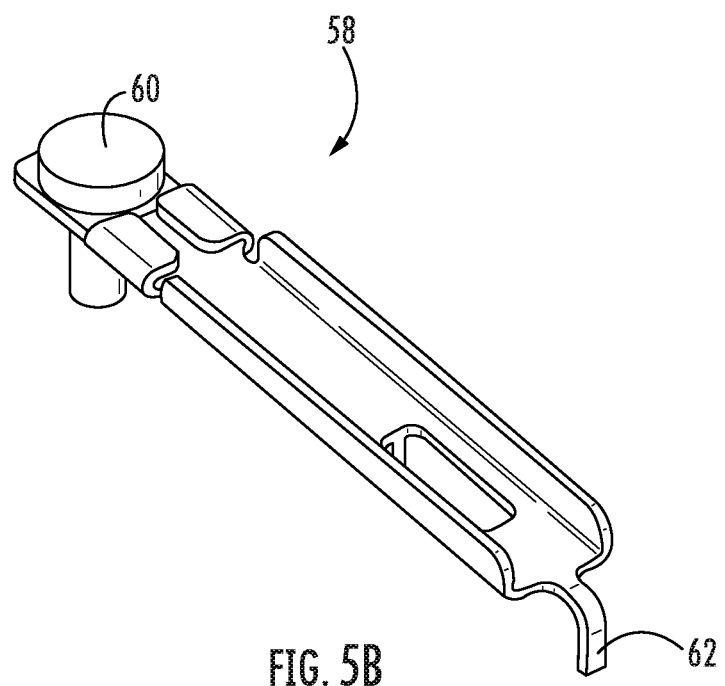

The valve 2 shown in FIG. 1 has another valve opening, specifically an opening 32 that connects the valve space 12 to the atmosphere to allow air to flow out of the valve space 12. Inside the valve space 12 or inside the flow chamber 24, an actuator 58 has been arranged, pivoted on the intermediate housing 8 and operatively connected to the actuating element 16. The actuator 58 is shown in more detail in FIGS. 4A, 4B. An alternative embodiment of the actuator 58 is shown in FIGS. 5A and 5B. On a section facing the opening 32, the actuator 58 has a second sealing element 60 to close the opening 32. On an end section facing the actuating element 16, the actuator 58 includes a shift finger 62 that is in contact with the actuating element 16 or rests on its first sealing element 42. If the actuating element 16 is operated and the valve opening 14 is opened, the shift finger 62 is also moved in stroke direction due to a restoring element 64, which is a leaf spring here, and therefore the actuator 58 is rotated around its pivot point, so that the opening 32 is closed by the second sealing element 60. If the SMA element 18 is no longer supplied with electricity and the actuating element 16 is therefore moved in resetting direction R owing to the restoring element 20, the shift finger 62 is likewise moved in resetting direction R by the actuating element 16 or its first sealing element 42. Because of that and due to a V-shaped pivot point 66 of the actuator 58, the second sealing element 60 opens the opening 32. Thus, the opening 32 to the atmosphere is released when the actuating element 16 is in closing position and closed when the actuating element 16 is in releasing position. In the alternative embodiment of the actuator 58 shown in FIGS. 5A and 5B, a restoring element 64 is attached to the projections 63 (not shown). The actuator 58 is rotated around a pivoted point (not shown). Also, the first check valve 70 is arranged in the second area of the flow chamber 24c. The first check valve 70 is designed in a way to allow a current of the fluid to flow from a first area of the flow chamber 24a through the valve opening 14 to the second area of the flow chamber 24c. In reverse direction, the first check valve 70 prevents a return flow from the second area of the flow changer 24c through the valve opening 14.

Figure 2A:
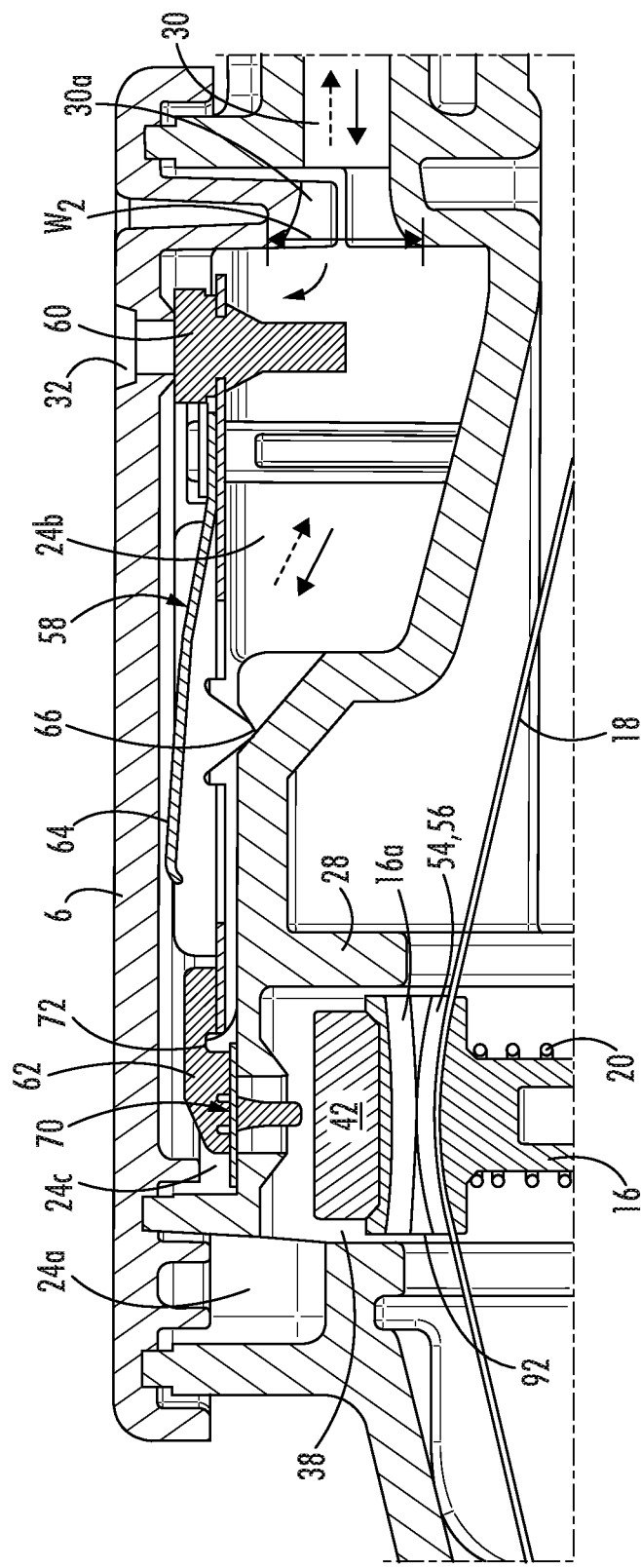
FIG. 2A is a section of the valve from FIG. 1 in opening position.
Figure 2B:
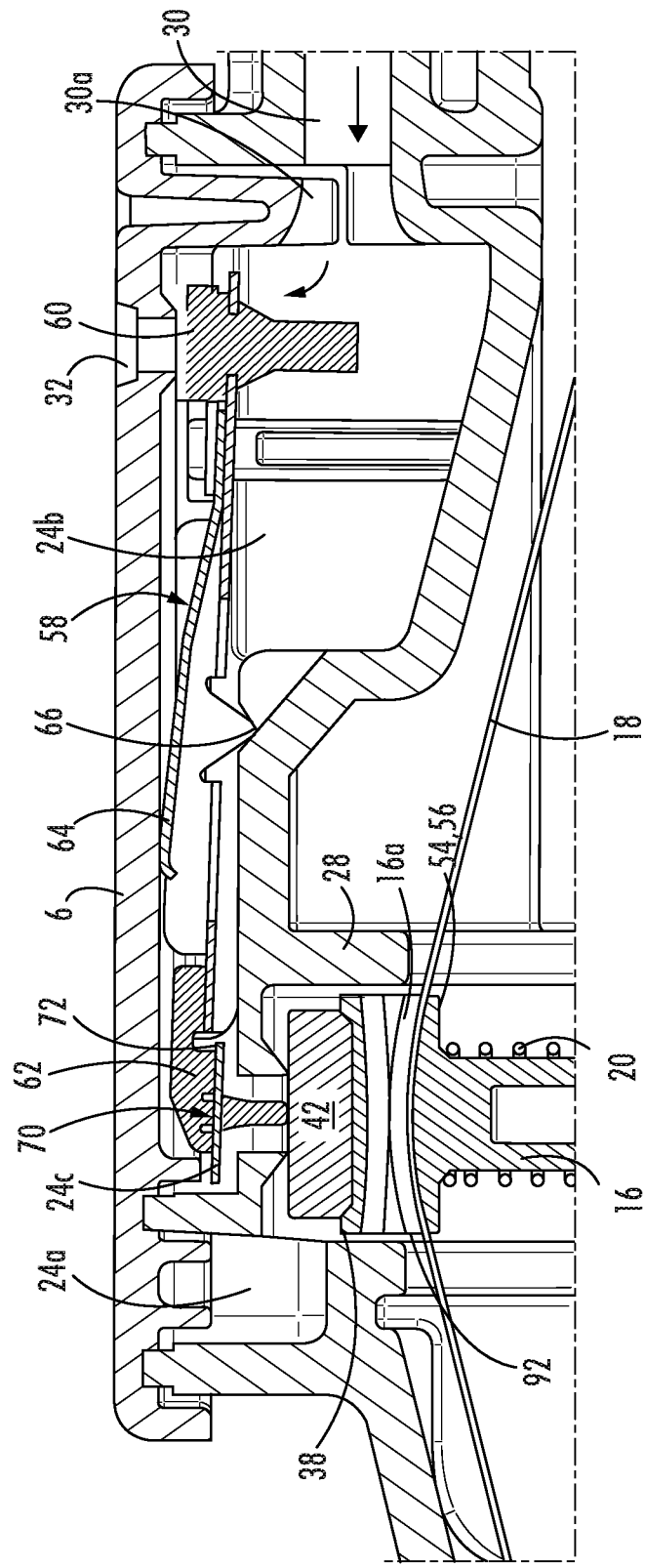
FIG. 2B is a section of the valve from FIG. 1 in closing position.

FIG. 2A shows a section of the valve 2 according to FIG. 1 in an opening position, so fluid can flow through the connecting channel 24c that connects the first area 24a and the second area 24b of the flow chamber 24 and the valve opening 14. FIG. 2B shows the same section of the valve 2 in closing position. To fill a media reservoir, particularly with air, the first area 24a of the flow chamber 24 can be connected to an air supply unit. When the valve opening 14 is closed, only air is exchanged between the flow chamber 24 and the actuating chamber 26 via air gaps 92 executed between the separating wall 28 and the actuating element 16, and which fluidically connect the first area 24a of the flow chamber 24 and the actuating chamber 26 to one another in order to equalize the pressure inside the valve 2 or valve space 12. Here, the air gap 92 ends especially in the receiving space 38 formed by the partition wall 36. If the valve opening 14 is opened because the actuating element 16 is operated, the fluid or the air flows in the direction of the dashed arrows from the first area 24a of the flow chamber 24 through the connecting channel 24c and through the valve opening 14 to the second area 24b of the flow chamber 24 and not through the actuating chamber 26. The second area 24b of the flow chamber 24 is connected to the media reservoir or air cushion via the consumer connection 30, so the media reservoir can be filled. When this happens, the check valve 70 is opened and the sealing element 72 allows especially a flow of fluid to flow from the first area 24a toward the second area 24b. In the design shown, the sealing element 72 is attached to the shift finger 62 of the actuator 58 in such a way that the position of the sealing element 72 is fixed towards the shift finger 62.

Moreover, the valve 2 can be used to empty a media reservoir, as shown in FIG. 2B. The second area 24b of the flow chamber 24 has an opening 32 to the atmosphere through which the fluid flows out of the flow chamber 24 (arrow pointing to the opening 32).

In order to prevent a turbulent current of the fluid when it enters the consumer connection 30 and thus increase the flow to the media reservoir, an end section 30a of the consumer connector 30 facing the second area 24b of the flow chamber 24 has a larger clear width $W_2$ than an end section 30b facing the media reservoir, which has a smaller clear width $W_1$. The consumer connection 30, especially the end section 30a, is therefore executed in form of a funnel and is here bordered on its lower side by the intermediate housing 8 of the flow chamber 24 and on the upper side by the housing cover 6.

The air gaps 92 are arranged in an area surrounding the valve opening 14, in this case inside the partition wall 36 executed from the separating wall 28. As a result of this, a uniform cooling of the SMA elements is achieved because merely a secondary current of the fluid enters the actuating chamber 24 to ensure a pressure equalization. To prevent strong turbulence in the actuating chamber 24 and an excessive fluid inflow, additionally an opening cross section of the air gap 92 is smaller than a cross section of the connecting channel 24c or of the valve opening 14. Furthermore, the opening cross section of the air gap 92 is selected in such a way that the SMA elements are cooled in proportion to the volume flow. To create the air gap 92, the first end section 16a of the actuating element 16 and the first sealing element 42 arranged on it also have a smaller diameter than a clear width of the receiving space 38. Thus, the first sealing element 42 that closes the valve opening 14 in the closing position ends laterally at a distance in front of the partition wall 36 that creates the receiving space 38 so the air channel 92 can be executed. As a result of this, when the valve opening 14 is closed, air can be exchanged between the flow chamber 24 and the actuating chamber 26 through the air gap 92.

The first end section 16a of the actuating element 16 has at least one passage opening 54 extending perpendicularly to the direction of movement B of the actuating element 16, which extends centrically—with regard to the direction perpendicular to the direction of movement B—through the first end section 16a. Provided the actuating element 16 has merely one such passage opening 54, the SMA element 18 can be guided through this passage opening according to the "needle-thread principle" and be reliably held therein. Alternately, the passage opening 54 can additionally be made accessible via a lateral slit 56, which starting from a position—spaced apart from the passage opening 54 in the direction of movement B of the actuating element 16—extends on an outer circumferential surface of the first end section 16a towards the passage opening 54, i.e. transversally from top to bottom. The middle section of the SMA element 16 is inserted into the passage opening 54 through the slit 56 and is guided in the assembled state inside the passage opening 54 to prevent the SMA element 16 from slipping out, thus ensuring its secure hold.

When the actuating element 16 is operated and the valve opening 14 opened, the shift finger 62 is also moved in stroke direction owing to a restoring element 64, here a leaf spring, and the actuator 58 is thus turned around its pivot point, so that the opening 32 is closed by the second sealing element 60. If the SMA element 18 is no longer supplied with electricity and the actuating element 16 is therefore moved to the reset direction R owing to the restoring element 20, then the shift finger 62 is likewise moved in reset direction R by the actuating element 16 or its sealing element 38. As a result of this, and due to a V-shaped pivot point 66 of the actuator 58, the second sealing element 60 opens the opening 32. The opening 32 to the atmosphere is therefore released when the actuating element 16 is in closing position and closed when the actuating element 16 is in the releasing position, thereby ensuring that the second area 24b of the flow chamber 24 of the valve space 12 or a media reservoir is always vented when the valve 2 is not operated. Moreover, the actuating chamber 26 is attached to the first area 24a of the flow chamber 24 and above to the pump. Such a valve is used, for example, in a vehicle seat with massage function, whereby one or several air cushions are in each case cyclically aerated and vented.

Figure 3A:
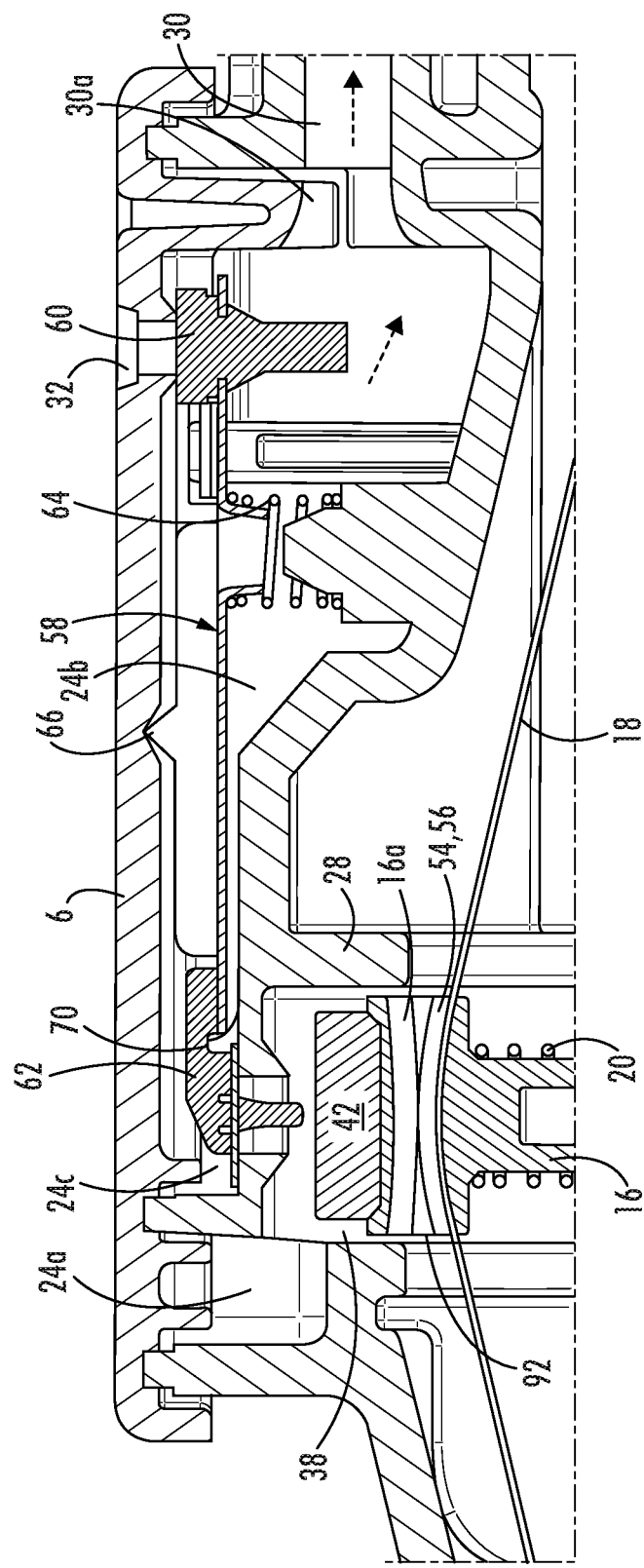
FIG. 3A is a section of a valve as in FIGS. 2A, B according to a second embodiment with the first check valve opened.
Figure 3B:
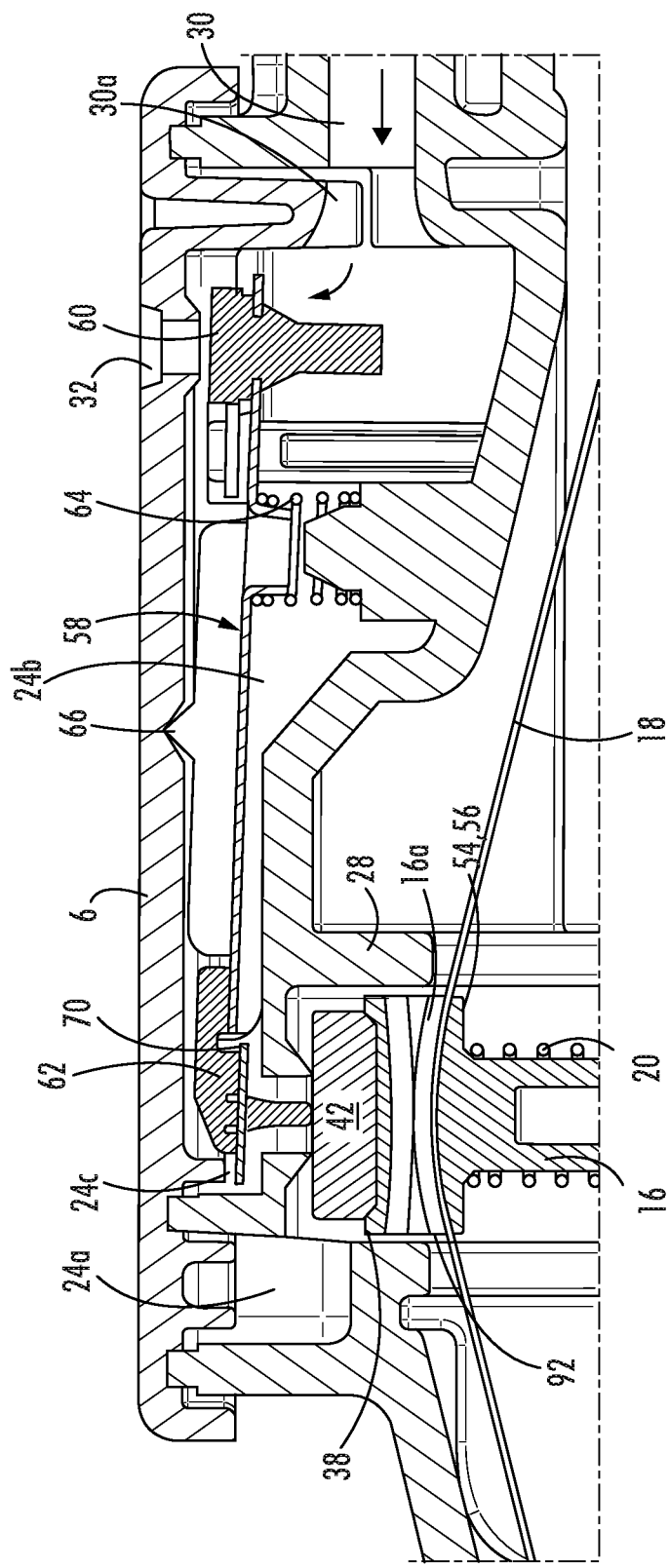
FIG. 3B is a section of a valve as in FIGS. 2A, B according to a second embodiment with the first check valve closed, FIGS. 4A, B are views showing an actuator to close and release the opening to the atmosphere according to a first embodiment, FIGS. 5A, B are views showing an actuator to close and release the opening to the atmosphere according to a first embodiment.

FIGS. 3A and 3B show a second design of the valve 2. The valve shown in FIG. 3A differs from the valve shown in FIG. 2 in the design of the actuator 58. The valve 2 shown in FIG. 3A has the actuator 58 shown in FIGS. 5A and 5B. With the restoring element 64, the actuator 58 can be turned between a release of the opening 32 and a closing position—as shown in FIG. 3A—through the pivot point 66. The dotted arrows indicate the flow of the fluid from the first area of the flow chamber through the valve opening 14, past the first check valve 70 in the second area of the flow chamber 24c. The air then continues to flow toward the consumer connection 30. FIG. 3B shows the same valve seen in FIG. 3A. In this case, however, the first check valve 70 is closed, so that when the opening 32 to the atmosphere and the first check valve are closed, the air flowing in through the consumer connection 30 cannot flow out of the valve 2 again and a pressure holding function is achieved.

Figure 6:
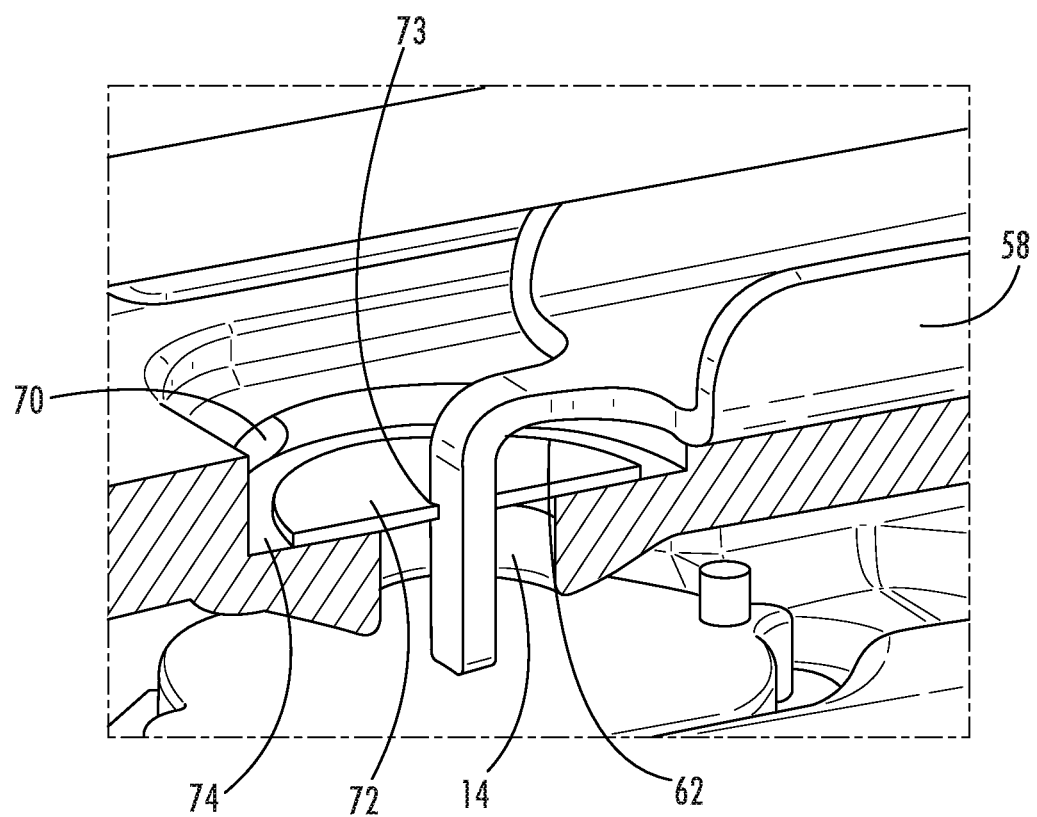
FIG. 6 is a detailed representation of the first check valve.

The first check valve 70 from FIG. 1 as well as 2A, 2B, 3A and 3B can be designed especially as shown in FIG. 6. FIG. 6 shows an actuator 58 with a shift finger 62 on the side facing the actuating element 16. The shift finger 62 grasps through a through hole 73 of the third sealing element 72. The third sealing element 72 is designed as a circular disk preferably made of metal or elastomer. The sealing element 72 lies in a closing position of the check valve 70 on the valve seat 74, so that a fluid flowing from the side of the valve seat 74 toward the valve opening 14 presses the sealing element 72 on the valve seat 74. Conversely, a fluid coming from the side of the valve opening 14 presses the third sealing element 72 away from the valve seat 74, thereby opening the check valve 70 for this flow direction. Here, the sealing element 72 can be designed in a movable way (as shown in FIG. 6), on the shift finger 62 or fixed, as shown in FIGS. 2A-3B.

Figure 7:
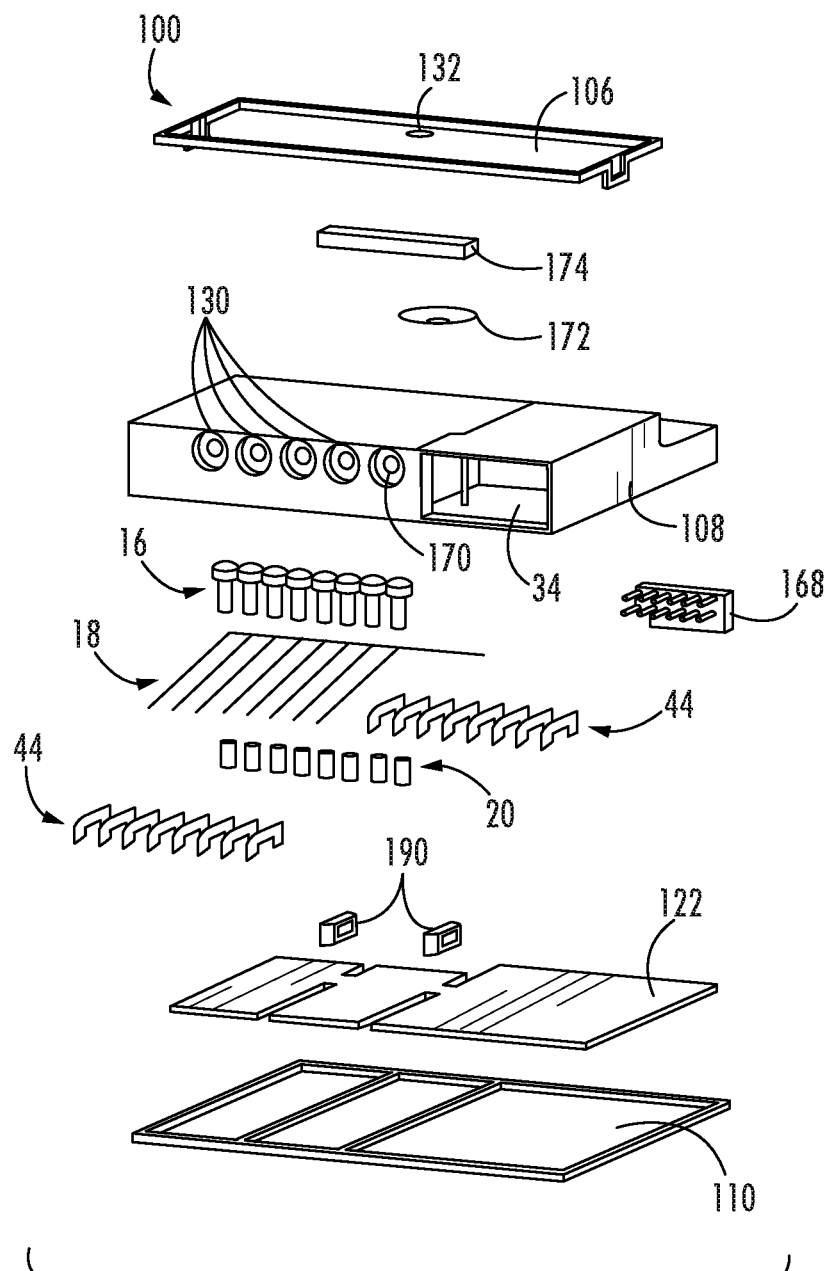
FIG. 7 is an exploded view of a valve arrangement having several valves with an intermediate housing according to an embodiment.

A valve arrangement 100 with several valves 2 is shown in the exploded view of FIG. 7. The valve arrangement 100 comprises here a common valve housing for all valves 2. In other words: The valve housings that in each case enclose the valve space 12 of a valve 2, namely both the intermediate housing 108, the valve cover 106 and the housing bottom 110, are executed as one single piece. Thus, the valve arrangement 100 has a common intermediate housing 108, a common housing cover 106 and a common housing bottom 110, inside which the respective valve space 12 of a valve 2 is executed. Furthermore, the valve arrangement 100 has a common printed circuit board 122 executed as one single piece for all valves 2. As a result of this, the space needed for the several valves 2 of the valve arrangement 100, the number of the needed parts and assembly of the valve arrangement 100 can be significantly reduced compared to the valve arrangements known so far.

The valves 2 of the exemplary valve arrangement 100 are essentially executed like the valve 2 described by means of FIG. 1, the matching components are given the same reference characters. They have in each case, inside the valve space 12 between a closing position to close the valve opening and an opening position to release the valve opening, an axially movable actuating element 16, a wire-shaped SMA element 18 to operate the actuating element 16 in opening direction and a restoring element 20 that serves to move the actuating element 16 in closing direction. The SMA elements 18 are, in turn, electrically connected to the printed circuit board 22 with their respective ends by means of a crimp connector 44. With another middle section, the SMA elements 18 are in each case fixed to the corresponding actuating element 16 to operate it in a stroke direction when electricity is supplied to it. To do this, the printed circuit board 22 is controlled or electrically contacted through an electrical plug-in connector 168 through a receiving space 34 of the intermediate housing 108. Furthermore, between the intermediate housing 108 and the valve cover 106 a second check valve 172 has been exemplarily arranged in combination with a pressure sensor, for example. Inside the valve housing, a cushioning foam 174 is additionally arranged to reduce the generation of noise, especially when the valve 2 is vented. The intermediate housing 108 has a pressure connection 170 to be connected to an air supply unit and four consumer connectors 130 for connection to four media reservoirs, especially air cushions of a vehicle seat with contour adjustment or massage function.

Figure 8:
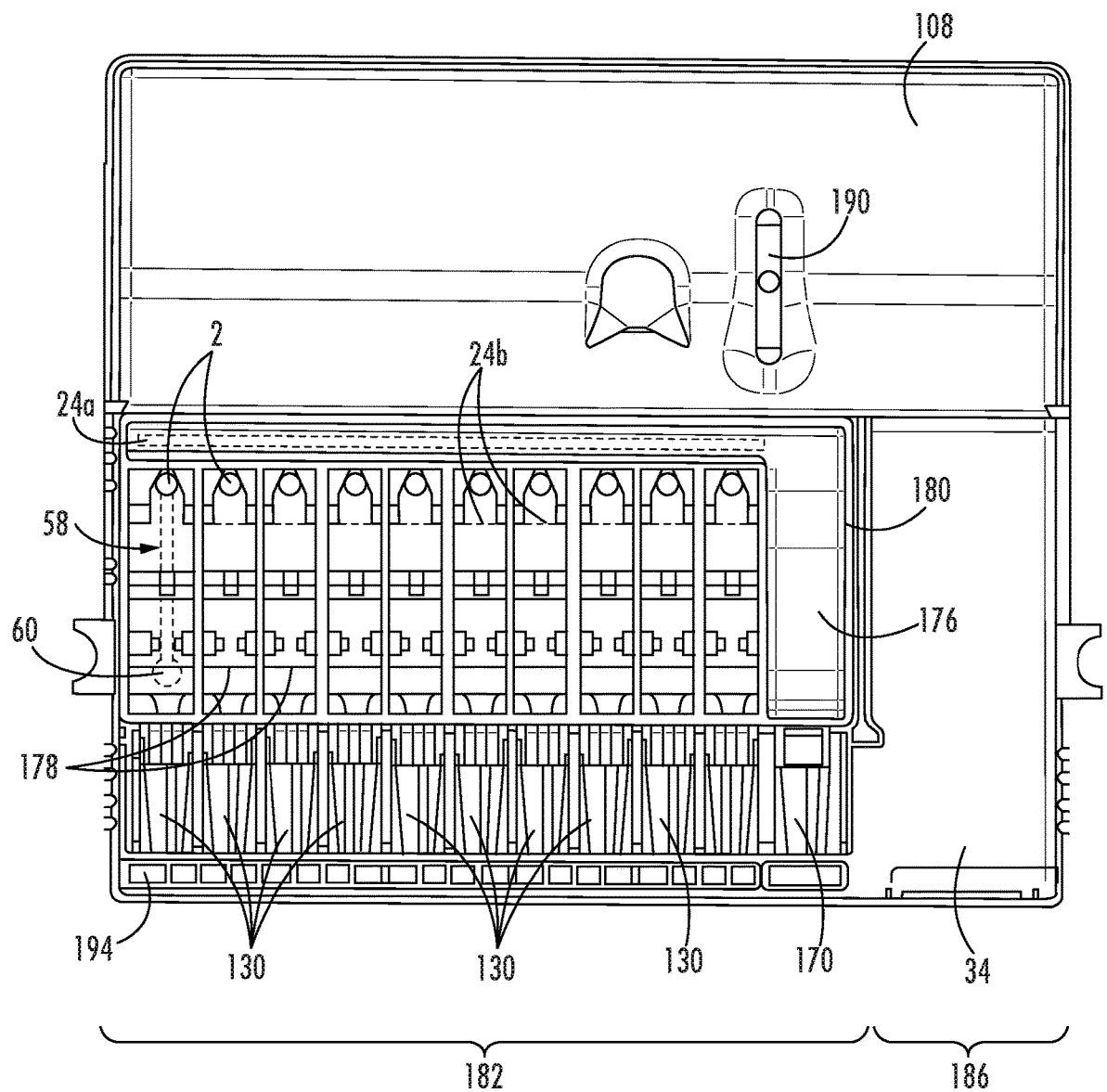
FIG. 8 is a top view of an intermediate housing of a valve arrangement according to an embodiment.

FIG. 8 shows an intermediate housing 108 according to an embodiment, namely for a valve arrangement, that has several valves 2 executed according to FIG. 1, i.e. 3/3-way valves, and for carrying out the massage function of a vehicle seat, i.e. that can be used for the cyclic aerating and venting of several air cushions or with a pressure holding function for adjusting the contour in a vehicle for lumbar or lateral support.

The intermediate housing 108 has a common pressure connection 170 through which all valves 2 can be connected to a pneumatic pump, whereby the pressure connection 170 is connected in each case to the first areas 24a of the flow chambers 24 of the valves 2 via an air channel 176 executed inside the intermediate housing 208 or ends in them. For clarity reasons, the actuator 58 is indicated with a dotted line only for one of the valves 2. In each valve 2, an opening to the atmosphere is executed in the housing cover to connect the second areas 24b of the flow chambers to the atmosphere (cf. FIG. 1). One media reservoir has been assigned to each valve 2 with which the respective valve 2 or its second area 24b is connected via an air channel 178 and via consumer connections 130.

In an intermediate housing 108 executed in such a way, the valve arrangement has a continuous pressure area 182 separated from an electronics area 186, in turn via a separating wall 188. A transition 190 of the printed circuit board between the pressure area 182 and the electronics area 186 is pneumatically sealed.

To fill a media reservoir, air flows through the air channel 176 into the first areas 24a or into the area 182 that includes the first areas 24a and through air gaps 92 into the actuating chamber 26. If the valve opening 14 is opened, air flows from the first area 24a through the connecting channel 24c and through the valve opening 14 into the second area 24b, and from there—possibly through more air channels not shown here—through the consumer connections 130 to the respective media reservoir. At the same time, the actuator 58 is moved, so that the opening 32 is closed. To vent the media reservoir, the valve opening 14 is closed by moving the actuating element 16 in resetting direction, which also moves the actuator 58 is, thus releasing the opening 32. As a result of this, the air trapped inside the media reservoir that is under excess pressure glows out of the valve 2 through the opening 32. Even in the intermediate housing 108, the air channels 176 and the area 182 are formed by the intermediate housing itself. To maintain the pressure in the media reservoir, the check valve 70 can close the valve opening 14 (cf. FIG. 1) so no air can flow back from the media reservoir to the first area 24a.

LIST OF REFERENCE CHARACTERS 2, 2a, 2b Valve
4 Valve housing
6 Housing cover
8 Intermediate housing
10 Housing bottom 12 Valve space
14 Valve opening
16 Actuating element
16a First end section of the actuating element
16b Second end section of the actuating element
18 SMA element
18a First end of the SMA element
18b Second end of the SMA element
18c Middle section of the SMA element
20 Restoring element (coil spring)
22 Printed circuit board
22a Upper side of the printed circuit board
22b Lower side of the printed circuit board
24 Flow chamber
24a First area of the flow chamber
24b Second area of the flow chamber
24c Connecting channel
26 Actuating chamber
28 Separating wall
30, 130 Consumer connections
30a, 30b End sections of the consumer connection
31a, b, c, d Sections of the consumer connection
32 Opening
34 Receiving space
36 Partition wall
38 Receiving space
40 Recess
42 First sealing element
44 Crimp connector
46 Seat of the crimp connector
48 Section of the crimp connector
50 Clamping elements
52 Projection
54 Passage opening
56 Slit
58 Actuator
60 Second sealing element
62 Shift finger
63 Projection
64 Restoring element
66 Pivot point
70 First check valve
72 Third sealing element
73 Through hole
74 Valve seat
92 Air gap
94 Guiding element
100 Valve arrangement
106 Housing cover
108 Intermediate housing
110 Housing bottom
116 Actuating element
168 Plug-in connector
170 Pressure connection
172 Second check valve
174 Cushioning foam
176 Air channel
178 Air channels
182 Pressure area
184 Venting area
186 Electronics area
188 Separating wall
190 Bonding surface
B Moving direction of the actuating element
H Stroke direction
R Resetting direction
$A_1$ Lateral protrusion of the crimp connector
$A_2$ Axial protrusion of the crimp connector
$W_1$ Clear width of end section 30b
$W_2$ Clear width of end section 30a

The invention claimed is:

1. A valve comprising:
 a valve housing having a housing cover, a housing bottom, and an intermediate housing arranged between the housing cover and the housing bottom, the valve housing enclosing a valve space having a flow chamber and an actuating chamber, the valve housing defining at least one valve opening extending from the flow chamber to the actuating chamber;
 at least one actuating element being located in the actuating chamber and being axially movable between a closing position to close the valve opening and an opening position to release the valve opening, an SMA element made of a shape memory alloy being configured to operate the actuating element in the opening direction, a restoring element being configured to move the actuating element in a closing direction, the SMA element having ends electrically connected to a printed circuit board to supply electricity to the SMA element, the SMA element having a middle section fixed to the actuating element;
 the flow chamber and the actuating chamber being separated by a separating wall in the valve opening so that a fluid flowing through the valve when the actuating element is operated is guided through the flow chamber, a first area of the flow chamber and a second area of the flow chamber being connected via at least one of the valve opening and a connecting channel, the at least one of the valve opening and the connecting channel being closed when the actuating element is in the closing position and being opened when the actuating element is in the opening position of the actuating element;
 the first area of the flow chamber being attachable to an air supply unit to supply air to the flow chamber, the second area of the flow chamber being attachable to a media reservoir, the second area of the flow chamber being connectable to atmosphere to release air from the flow chamber via an opening;
 an actuator located inside the second area of the flow chamber, the actuator being pivoted on the intermediate housing and being coupled with the actuating element in such a way that the opening to the atmosphere is released when the actuating element is in the closing position and the opening is closed when the actuating element is in the opening position; and
 a first check valve associated with the valve opening, the first check valve preventing fluid from flowing back from the second area of the flow chamber through the valve opening into the first area of the flow chamber when the actuating element is in the opening position.

2. The valve according to claim 1, wherein the actuator includes a shift finger on an end section facing the actuating element, the first check valve including a sealing element arranged on the shift finger and a valve seat arranged in the separating wall.

3. The valve according to claim 1, wherein the sealing element is a plate-shaped element.

4. The valve according to claim 2, wherein the sealing element is a lip seal.

5. The valve according to claim 2, wherein the sealing element includes one of a metal, a plastic, or an elastomer.

6. The valve according to claim 2, wherein the second area of the flow chamber defines an opening to the atmosphere.

7. The valve according to claim 2, wherein the separating wall is formed by the intermediate housing.

8. The valve according to claim 2, wherein the flow chamber and the actuating chamber are fluidically connected through at least one air gap surrounding the valve opening.

9. The valve according to claim 8, wherein the separating wall has a partition wall disposed at least partially around the valve opening and extending into the actuating chamber in a direction of movement of the actuating element, the partition wall defining a receiving space for the actuating element, a first end section of the actuating element facing the valve opening and being guided to the receiving space, the at least one air gap ending in the receiving space.

10. The valve according to claim 8, wherein the actuating element has a first sealing element on a first end section facing the valve opening, the first sealing element closing the valve opening, the at least one air gap being laterally spaced apart from the partition wall.

11. A valve arrangement including a plurality of the valves according to claim 1, whereby the valve housings enclosing the valve space of each of the valves are executed as one unitary valve housing.

12. The valve arrangement according to claim 11, wherein at least one of: all of the intermediate housings, all of the valve covers, all of the housing bottoms, and all of the printed circuit boards of the valves are formed in respective unitary elements.

13. The valve arrangement according to claim 11, wherein the valves have a common pressure connection ending in the valve space.

14. The valve arrangement according to claim 12, wherein the common pressure connection ends in the first areas of the flow chambers of the valves.

15. The valve arrangement of claim 11, wherein the common pressure connection is connected the first areas of the flow chambers through at least one air channel.

16. The valve arrangement of claim 14, wherein each of the valves defines a separate opening that ends in the second areas of the flow chambers to connect to the atmosphere.

17. The valve arrangement according to claim 11, wherein the valve spaces of the valves are separated from a receiving space for the electronic contacting of the printed circuit board by respective separating walls, the separating walls being unitary with the intermediate housing, the separating walls defining a pneumatically sealed passage opening for the printed circuit board.

18. The valve arrangement according to claim 11, wherein the one unitary valve housing defines at least one an air channel leading from the air supply unit to at least one of the flow chambers, guiding elements being arranged in the at least one air channel to guide a fluid flowing through the at least one of the flow chambers in a laminar flow.

* * * * *